United States Patent [19]

Nakanishi

[11] Patent Number: 4,974,820
[45] Date of Patent: Dec. 4, 1990

[54] BELLOWS TYPE SHOCK ABSORBER
[75] Inventor: Motoyasu Nakanishi, Fujishi, Japan
[73] Assignee: Suzuki Sogyo Kabushiki Kaisha, Shimizushi, Japan
[21] Appl. No.: 355,186
[22] Filed: May 22, 1989

Related U.S. Application Data
[63] Continuation-in-part of Ser. No. 271,697, Nov. 16, 1988, Pat. No. 4,856,626, which is a continuation of Ser. No. 40,475, Apr. 20, 1987, abandoned.

[51] Int. Cl.⁵ .............................................. F16F 3/08
[52] U.S. Cl. ................................... 267/152; 188/268; 188/298; 188/371; 267/64.15; 267/122; 267/195; 267/259
[58] Field of Search .................... 267/35, 64.23, 64.15, 267/122, 195, 257, 219, 227, 259, 121, 152; 188/268, 298, 371, 322.5; 280/710, 712

[56] References Cited
U.S. PATENT DOCUMENTS

| | | | |
|---|---|---|---|
| 3,202,388 | 8/1965 | Goodwin | 267/122 X |
| 3,243,154 | 3/1966 | Dryden | 267/121 X |
| 3,588,159 | 6/1971 | Duckett et al. | 267/122 X |
| 3,695,665 | 10/1972 | Matsuura | 267/122 X |
| 4,002,244 | 1/1977 | Matsumoto et al. | 188/268 X |
| 4,005,858 | 2/1977 | Lochner | 188/268 X |
| 4,576,366 | 3/1986 | Gallas et al. | 267/219 |

FOREIGN PATENT DOCUMENTS

| | | |
|---|---|---|
| 0105794 | 4/1984 | European Pat. Off. . |
| 1124832 | 3/1962 | Fed. Rep. of Germany ........ 267/35 |
| 1260067 | 8/1961 | France . |
| 524287 | 8/1940 | United Kingdom ................. 267/35 |
| 533190 | 2/1941 | United Kingdom ................. 267/35 |
| 895798 | 5/1962 | United Kingdom . |

OTHER PUBLICATIONS

European Search Report, No. 87 30 4114, dated Sep. 2, 1988.
IBM Technical Disclosure Bulletin, vol. 21, No. 5, dated Oct. 1978, "Variable Damping Supporter", p. 1765.
Patent Abstracts of Japan, vol. 4, No. 64, dated May 1980, "Vibration-Proof Support".

Primary Examiner—George E. A. Halvosa
Attorney, Agent, or Firm—Wenderoth, Lind & Ponack

[57] ABSTRACT

A bellows type shock absorber comprises a sealed bellows, a shock absorbing column which is provided with a chamber around it inside the bellows and which is along the axial line of the bellows and combined with the bellows so that it physically varies in conjunction with expansion and contraction of the bellows. Also, the bellows type shock absorber may have a through hole which communicates the internal chamber and the outside, and preferably the shock absorbing column is made of a kind of gelled material with a penetration value of approximately 50 to 200. This shock absorber is provided with the main bellows and a sub-bellows having a spring constant differing from that of the main bellows and a through hole which communicates the internal chamber of the main bellows and the internal chamber of the sub-bellows.

16 Claims, 6 Drawing Sheets

BELLOWS TYPE SHOCK ABSORBER

CROSS-REFERENCES TO RELATED APPLICATIONS

This application is a continuation-in-part of Applicant's application 07/271,697, filed Nov. 16, 1988, now U.S. Pat. No. 4,856,626, dated Aug. 15, 1989, which in turn is a continuation application of application 07/040,475, filed Apr. 20, 1987, and now abandoned.

BACKGROUND OF THE INVENTION

The present invention relates to the shock absorber using bellows.

This type of bellows type shock absorber is adapted to absorb vibration by virtue of the spring characteristics of the bellows which is made of a resilient material and interpositioned between the source of vibration or shock and an item requiring a shock absorbing protection. Such shock absorber is employed in various types of shock absorbing equipment since its resonance point can be varied as required by varying the number of crests, diameter and wall thickness of the bellows.

The performance generally required for the shock absorber is important in two points that the resonance frequency is low and the magnification ratio of resonance is small.

Rubber-based shock absorbers of various types of conventional shock absorbers are disadvantageous in that the resonance frequency used by them is high but, for the spring type and air-cushion type shock absorbers, the resonance frequency can be shifted to the lower frequency zone.

However, it is difficult to reduce the magnification of resonance in the case of these shock absorbers since repercussive resilience acts on application of vibration, and this is the same with the bellows type shock absorber in the theoretically similar construction to the spring type shock absorber.

How to reduce the magnification of resonance at this resonance point is the greatest problem relating to this bellows type shock absorber.

An object of the present invention is to provide a bellows type shock absorber capable of reducing the magnification of resonance at the resonance point.

This object is achieved by providing the shock absorbing column made of a gelled material in the bellows.

Another object of the present invention is to provide a sealed bellows type shock absorber which can be used even under adverse environmental conditions and can be achieved by providing a sub-bellows in addition to the main bellows.

Another object of the present invention is to provide a bellows type shock absorber for which the resonance frequency in the shock absorber of the present invention can be varied in accordance with variation of the load applied to the main bellows, and this object can be achieved by providing the flow control means for the through hole for use in suction and discharge of air by the bellows.

SUMMARY OF THE INVENTION

The shock absorber in accordance with the present invention is provided with the shock absorbing column made of a gelled material with a penetration value of approximately 50 to 200 inside the bellows.

This shock absorbing column is arranged along the axial line of the bellows to connect upper and lower internal surfaces of the bellows at its upper and lower ends and the bellows is provided with the through hole which communicates with the interior of the bellows.

The internal chamber is provided around said shock absorbing column inside the bellows and filled with a fluid such as air or oil.

In the second embodiment, the sub-bellows is provided adjacent to said bellows and the internal chamber of this sub-bellows and the internal chamber of said main bellows are communicated by said through hole.

In the third embodiment, the through hole is made up with a flow control means such as, for example, a needle valve which controls the flow rate of fluid from the bellows.

In fourth and fifth embodiments, a plurality of through holes and/or sub-bellows allow for the achievement of even greater fine-tuning of the shock-absorbing characteristics of the invention.

The shock absorber in accordance with the present invention is constructed as described above. If a pressure in the axial direction is applied to the bellows, the bellows contracts accordingly and the fluid is discharged as much as the increase of pressure in the internal chamber of the bellows from the through hole by such contraction of the bellows and simultaneously the shock absorbing column made of gelled material is expanded in the direction at right angles to the axis of the bellows while reducing the length in its axial line.

Shock absorbing motion of this shock absorbing column provides an extremely small repercussive resilience because it is made of gelled material.

In said second embodiment, the fluid in the bellows flows into the sub-bellows when the bellows contracts to raise the internal pressure of the sub-bellows. Accordingly, the sub-bellows is expanded owing to this motion. At this time, the repercussion of the sub-bellows thus produced acts on the main bellows as the resistance against contraction of said bellows.

Therefore, the natural resonance frequency and the magnification of resonance of the main bellows are varied by the repercussion of the sub-bellows.

In the third embodiment, since said through hole is adapted to serve as the flow control means, the expansion and contraction characteristics of the bellows are varied in accordance with the discharged volume of fluid and the resonance frequency will be accordingly varied.

DETAILED DESCRIPTION OF THE INVENTION

Figure 1:
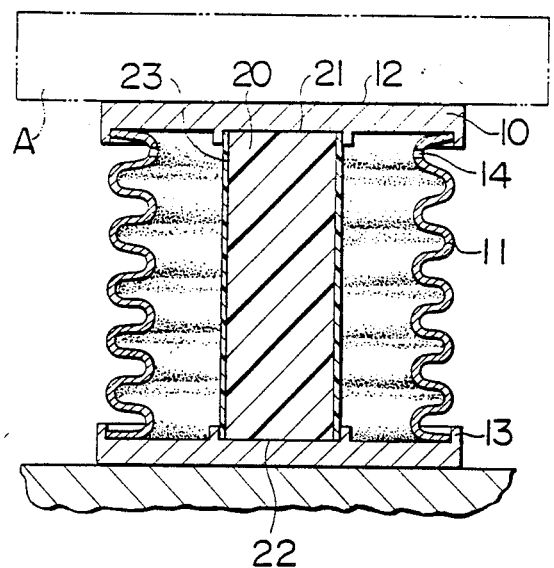
FIG. 1 is a vertical cross sectional view of the shock absorber in accordance with the present invention.
Figure 2:
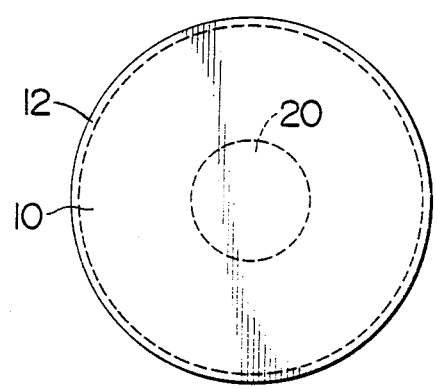
FIG. 2 is a plan view of the shock absorber as shown in FIG. 1.

In the embodiment shown in FIGS. 1 and 2, bellows 10 comprises bellows body 11 and covers 12 and 13, bellows body 11 is sealed with covers 12 and 13 provided at upper and lower ends of the bellows body 11 and shock absorbing column 20 made of gelled material is provided inside bellows body 11 along the axial liner of the bellows body. Upper and lower ends 21 and 22 of this shock absorbing column 20 are connected to the internal center surfaces of said covers 12 and 13.

Said shock absorbing column 20 is made of a gelled material with a penetration value of approximately 50 to 200 such as, for example, silicone and Toray Silicone CY52 (manufactured by Toray Silicone Kabushiki Kaisha) is suited as such silicone.

The penetration value herein shown is measured in accordance with JIS K 2530-1976-(50 g load).

This standard relates to the petroleum asphalt penetration testing method wherein samples with penetration value of 350 or less are tested with a load of 100 g and gelled materials are tested with a load of 50 g.

If silicone is thus used as the material, the weight and price of silicone can be reduced by mixing fine hollow spherical particles 24 such as fine particles of 5 to 300μ in diameter, referred to as micro sphere, micro balloon, hollow bubble or synthetic foam in silicone.

A compound type silicone gel material mixed with fine hollow particles as described above is described in detail in the Specification of U.S. Pat. No. 4,861,804.

In addition, the external surface of said shock absorbing column 20 can be preferrably covered with external layer 23 made of such flexible material as elastic material such as, for example, silicone rubber and, in case of shock absorbing column 20 made of silicone, the external surface of shock absorbing column 20 can be protected.

Figure 3:
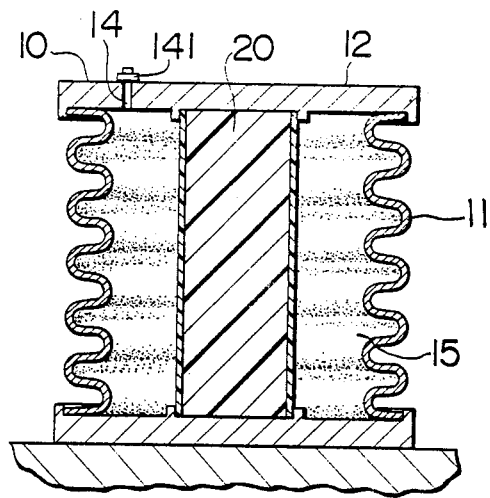
FIG. 3 is a vertical cross sectional view showing another embodiment of the shock absorber of the present invention.

Said bellows 10 is provided with through hole 14 in the outer wall of bellows body 11 or said covers 12, as shown in FIG. 3, and 13 to communicate the internal chamber of bellows 10 with the outside.

Bellows body 11 of said bellows 10 is generally made of resilient metallic material such as bronze phosphate (e.g. phosphor bronze) but, depending on the case, synthetic resin material having elasticity can be used. In either case, a composite type bellows construction which is made up by concentrically arranging another bellows having a larger diameter than that of bellows body 11 outside said bellows body 11 can be used.

In the above embodiment, if lower cover .13 of said bellows 10 is arranged to contact the vibration source side and the object A which requires shock absorbing is mounted on the other cover 12, vibration waves are absorbed by bellows body 11 and shock absorbing column 20 and the vibration energy conducted to the object A is damped.

Vibration waves to be applied to bellows 10 are absorbed by elastic deformation of bellows body 11 as well as by non-elastic deformation of shock absorbing column 20 made of gelled material and therefore the repercussion elasticity of bellows body 11 is suppressed by deformation of this shock absorbing column 20. Furthermore, said bellows 10 is provided with through hole 14 for communicating internal chamber 15 with the outside and, when the bellows 10 contracts internal air is discharged from through hole 14 due to an increase of pressure in the internal chamber 15 and, when bellows 10 is expanded, external air flows into the internal chamber due to a decrease of pressure in the internal chamber 15.

Accordingly, expansion and contraction of bellows 10 is affected by the air flow rate determined in accordance with the diameter of through hole 14 and, if the diameter is small, the air discharging resistance at the time of contraction of bellows 10 or the air suction resistance at the time of expansion acts in relation to the action of bellows 10, particularly resonance frequency.

The results of experiments of the shock absorber shown in this embodiment are described below.

The bellows used has the diameter of 50.5 mm between crests, height of 70 mm, five crests along its overall height and the through hole with diameter of 2 mm and is made of beryllium copper of 0.2 mm in thickness.

A conventional type bellows which does not internally contain the shock absorbing column was used in the first test and the shock absorbing column with 30 mm diameter made of silicone having the penetration value of 150 was provided inside the bellows in the second test.

Fine hollow particles referred to as Fillite (sold by Japan Fillite Kabushiki Kaisha) as the registered trademark were mixed as much as 35 weight per cent in this shock absorbing column.

In the third test, the bellows having the shock absorbing column which was used in the second test was stacked in two layers, one on top of another. In each of the above tests, the bellows was placed on the vibratory plate of the vibration producing unit providing the acceleration of 0.15 G and vibration G' transmitted to an object set on the top surface of the bellows was divided by vibration G of the vibratory plate and measured in terms of G'/G.

In the graph shown in FIG. 5, the 0 (zero) db line shows the level at which transmissibility T is "1" and the level is calculated with the formula given below.

Transmissibility T(db) =20 log (G'/G)

Figure 5:
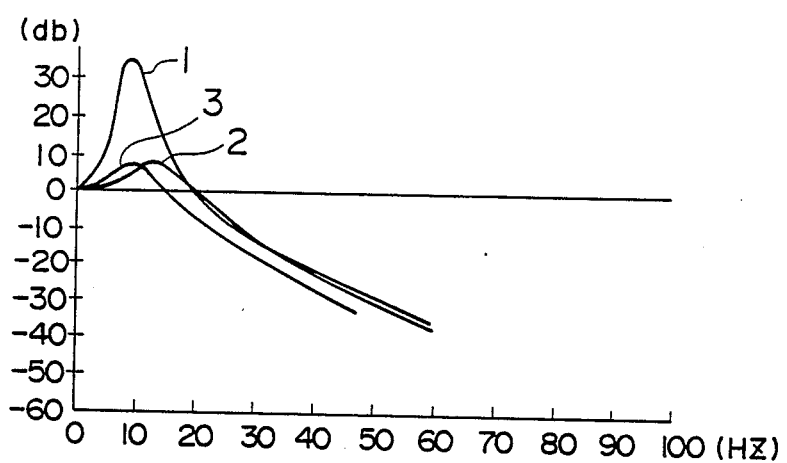
FIG. 5 is a graph describing the vibration transmitting characteristics of the shock absorber of the present invention.

The following describes the results of the above tests referring to FIG. 5 and Table 1. In FIG. 5, FIGS. 1, and 3 are shown as the test numbers.

TABLE 1

| Test No. | Resonance Point (Hz) | Magnification of Resonance (X) | Load (kg) |
| --- | --- | --- | --- |
| 1 | 8 | 16 ~ 18 | 16 |
| 2 | 13 | 2.24 | 16 |
| 3 | 9 | 2.1 | 9 |

In the third test, the load was set to 9 kg.

As known from the above, it was clarified that the magnification of resonance of the shock absorber in accordance with the present invention is extremely small as compared with the conventional bellows type shock absorber.

Said resonance frequency, as described above, can be adjusted by controlling the flow rate of air via through hole 14 and therefore needle valve 141 serving as through hole 14, if used as shown in FIG. 3, for adjusting the flow rate of air is advantageous in that transmissibility T can be reduced in accordance with the weight of object A.

Hereupon, said shock absorbing column 20 can be combined with bellows 10 so that it is physically deformed by expansion and contraction of bellows body 11 and another coupling means can exist between upper and lower ends of shock absorbing column 20 and upper and lower internal surfaces or the internal surfaces of covers 12 and 13 of bellows 10.

In each of the above embodiments, since the shock absorber is adapted so that internal chamber 15 of bellows 10 directly communicates with the outside, the resonance frequency of bellows 10 depends on the flow rate of air at through hole 14.

The shock absorber in accordance with the present invention, however, may be used in an environment with much water or pollutive particles where it is undesirable to suck external fluid into bellows 10.

Figure 4A:
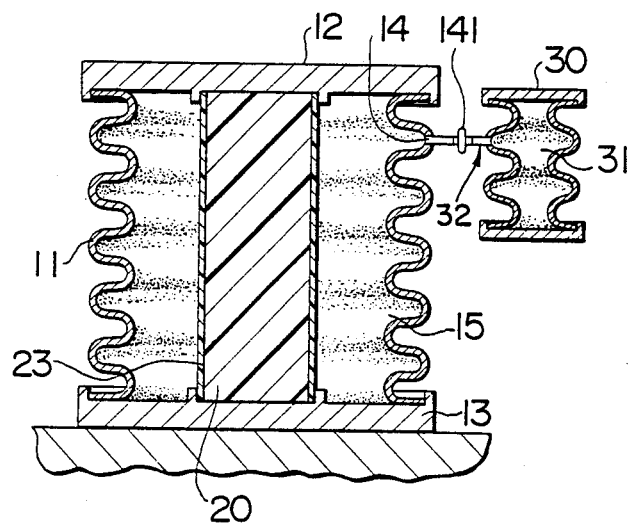
FIG. 4A is a vertical cross sectional view showing another embodiment of the shock absorber in accordance with the present invention.

The second embodiment provides the shock absorber which is convenient in such application as described above and characterized in that through hole 14 communicates with internal chamber 31 of sub-bellows 30 as shown in FIG. 4A.

In this embodiment, sub-bellows 30 communicates with through hole 14, which is provided with flow control valve 141, through tubular member 32.

Figure 4B:
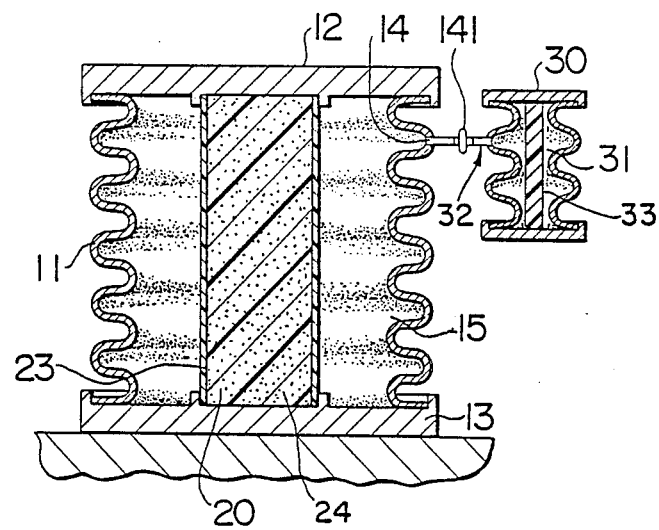
FIG. 4B is a vertical cross sectional view showing another shock absorber of the present invention.

Said sub-bellows 30 is made to provide a spring constant different from that of main bellows 10 in response to the capacity, material, plate thickness, diameter, number of crests, etc. Depending on the case, sub-bellows 30 contains the shock absorbing column made of gelled material as in main bellows 10. Such a case in which sub-bellows 30 contains a shock absorbing column 33 (analogous to shock absorbing column 20 of main bellows 10) is shown in the alternate embodiment of FIG. 4B.

Though said main bellows 10 and sub-bellows 30 can be filled with a gas, these bellows in this type of the shock absorber are generally filled with a fluid with a small expansion coefficient such as, for example, silicone oil or the like.

Accordingly, in case of the shock absorber related to the second embodiment, the spring constant of said sub-bellows 30 and the flow rate of said through hole 14 act to change the resonance frequency of main bellows 10 and the range of adjustment of the resonance frequency to be determined in relation to the load can therefore be vastly expanded.

The shock absorber according to the third embodiment is constructed in which the flow control means such as needle valve 141 is provided in through hole 14 as described in the above embodiments and the resonance frequency can be changed in response to the load of object A.

Figure 6:
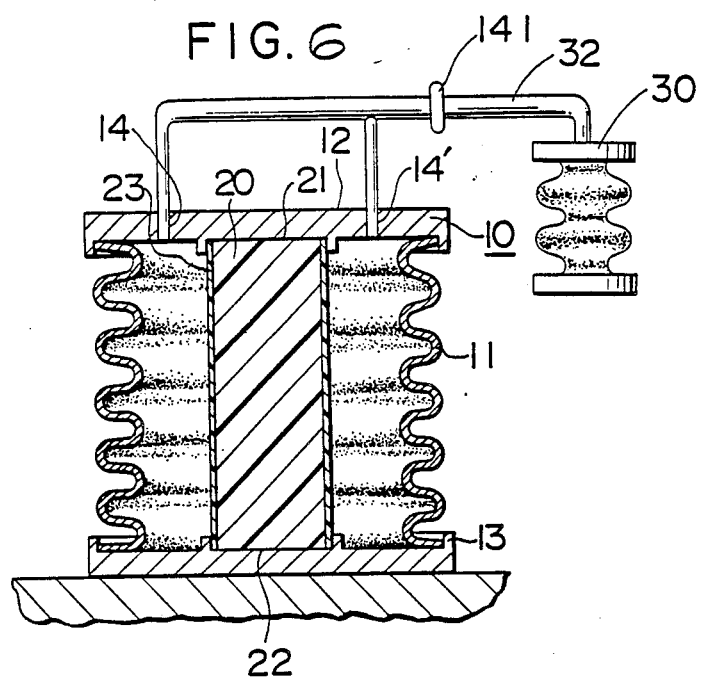
FIG. 6 is a vertical cross sectional view of a further embodiment of the shock absorber of the present invention.

FIG. 6 shows a fourth embodiment of a shock absorber. In this shock absorber a bellows 10 is connected to a sub-bellows 30 through a tubular member 32. The bellows 10 is provided with two through holes 14 and 14' in the cover 12. The tubular member 32 having two unnumbered tubular branches is connected to the holes 14, 14' and the sub-bellows 30. There can also be a needle valve 141 in tubular member 32, as in the third embodiment, for fine-tuning the shock absorbing characteristics according to the expected loads and frequency ranges. As will be apparent, in use the needle valve 141 is adjusted to control the flow rate of fluid through tube 32 from bellows 10 to sub-bellows 30 In that manner performance characteristics such as transmissibility T can be adjusted (see the performance discussed above for Test 3 and as shown in Table 1 and FIG. 5 for an analogous discussion of a different embodiment).

Figure 7:
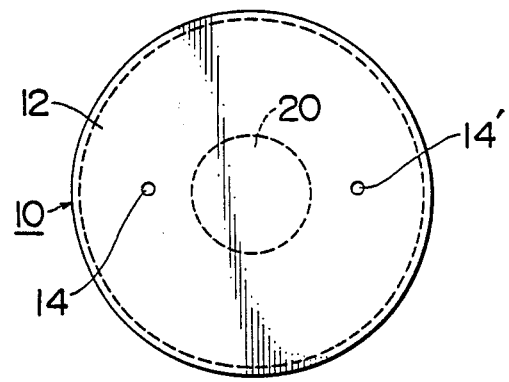
FIG. 7 is a plan view of another embodiment of a shock absorber of the present invention.
Figure 8:
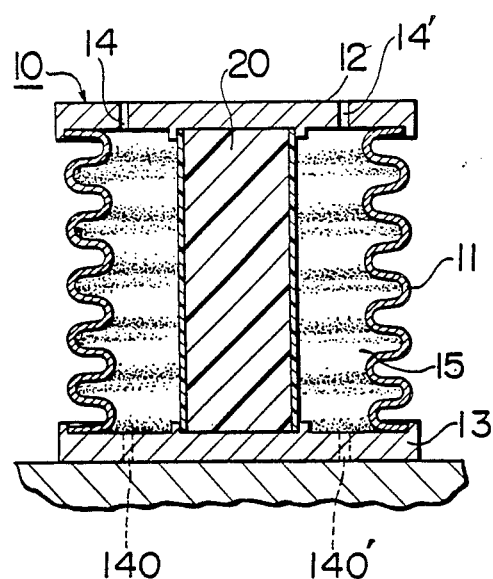
FIG. 8 is a vertical cross sectional view of the embodiment of the shock absorber of FIG. 7.

FIGS. 7 and 8 show a bellows 10 having covers 12 and 13 on the both ends. A plurality of through holes, such as, for example, two through holes 14 and 14' are provided in cover 12 which are open to the atmosphere. This construction has special interest in that it is easily designed and can be adjusted to fine tune the characteristics of resistance of the bellows 10 when the bellows is depressed by force. This fine-tuning is done by varying the numbers of through holes 14 and 14' and the respective diameters of the through holes 14 and 14'. In this embodiment, another through hole or holes 140 and 140' can be provided on the other cover 13 as shown by dot-line of FIG. 8. Since the number of through holes and the diameter of the through holes can be different in both covers 12 and 13, it is possible to use the bellows as two alternate types of shock absorbers having different characteristics simplY bY selecting either one of the covers 12 and 13 as the open side; namely, the upper side as shown in FIG. 8. In other words, in use, depending on the environment in which the shock absorber is used, the user simply installs the shock absorber so that either cover 12 or cover 13 is the cover with operative through holes 14 and 14' or 140 and 140' respectively.

Figure 9:
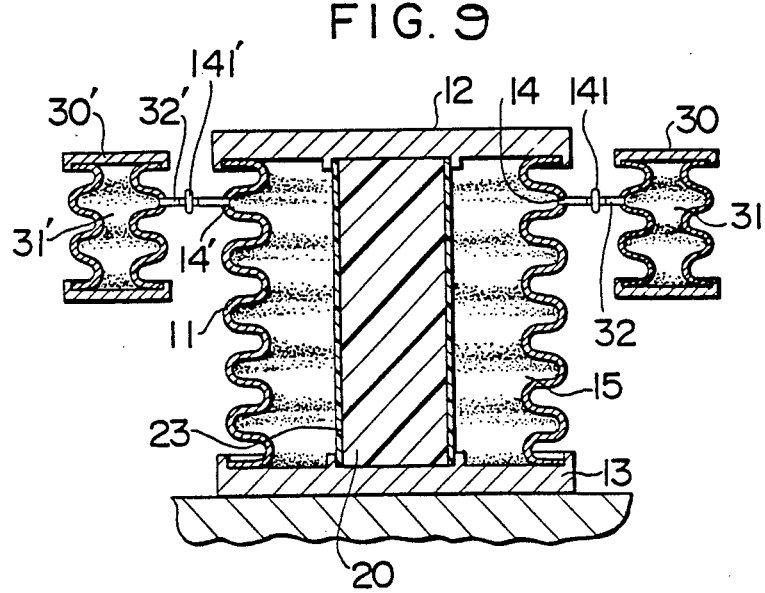
FIG. 9 is a still further embodiment of the shock absorber in accordance with the present invention.

FIG. 9 shows a still further embodiment of a shock absorber in which bellows body 11 has two through holes 14 and 14', and each hole 14 and 14' is connected to a sub-bellows 30 or 30' by a tubular member 32 or 32' through valves 141, 141'. As the sub-bellows 30 and 30', having internal chambers 31, 31' can each be engineered to have a special or specific characteristic depending on the intended use, respectively, the characteristics of the main bellows 10 can be adjusted as desirable. In other words, the shock absorbing characteristics of the main bellows can be varied simply by changing the sub-bellows as needed; hence, the design characteristics of the main bellows can be "indirectly" varied as a result of the operating parameters of the fluidly communicated sub-bellows.

It will thus be seen that the shock absorber has been provided which fulfills each of the above-mentioned objects. It will be obvious that many modifications of the embodiments shown may be made without departing from the spirit and scope of this invention. While several particular embodiments of this invention are disclosed above, it will be understood, of course, that the invention is not to be limited thereto, since many modifications may be made, and it is contemplated, therefore, by the appended claims, to cover any such modifications as fall within the true spirit and scope of this invention.

I claim:

1. A bellows type shock absorber comprising:
    a compressible and expansible bellows body having first and second open ends;
    a first and second cover member attached to and covering said first and second open ends of said expansible bellows body;
    a compressible and expansible gelled material shock absorbing column, said gelled material having a penetration value from about 50 to about 200 according to JIS K2530 (1976) at a 50 g load, said column having first and second ends attached to said first and second cover members, said gelled material shock absorbing column being surrounded by and spaced apart from said bellows body for defining an internal chamber around said shock absorbing column, said shock absorbing column contracting and expanding along with the compression and expansion of said bellows body without contacting said bellows body for absorbing repeated shocks applied to at least one of said first and second cover members; and at least two through holes in said first and second cover members for communicating said internal chamber defined by said gelled material shock absorbing column and said bellows body with the outside environment.

2. A bellows type shock absorber as in claim 1, wherein said shock absorbing column is a gelled material containing fine hollow particles.

3. A bellows type shock absorber as in claim 1, wherein at least one of said at least two through holes includes a flow control valve.

4. A bellows type shock absorber as in claim 1, wherein the external surface of said shock absorbing column is an elastic material.

5. A bellows type shock absorber as in claim 1, wherein said gelled material shock absorbing column is silicone.

6. A bellows type shock absorber as in claim 1, wherein said at least two through holes are provided in at least one of said first and second cover members.

7. A bellows type shock absorber comprising:
a compressible and expansible main bellows body having first and second open ends and having a spring constant;
a first and a second cover member attached to and covering said first and second open ends of said expansible main bellows body;
a compressible and expansible gelled material shock absorbing column having first and second ends attached to said first and second cover members, said gelled material shock absorbing column being surrounded by and spaced apart from said bellows body for defining an internal chamber around said shock absorbing column, said shock absorbing column contracting and expanding along with the compression and expansion of said bellows body without contacting said bellows body for absorbing repeated shocks applied to at least one of said first and second cover members;
at least two sealed sub-bellows, and each one of said at least two sub-bellows having an internal chamber;
at least two through holes in said main bellows body and a through hole in each one of said at least two said sub-bellows;
a tubular member attached to each of said at least two through holes in said main bellows and attached to each said through hole in each one of said at least two sub-bellows for communicating said main bellows body and said at least two sealed sub-bellows; and
each one of said at least two sub-bellows having a spring constant different from the spring constant of said main bellows body.

8. A bellows type shock absorbers as in claim 7, wherein said shock absorbing column is a gelled material having a penetration value of approximately 50 to 200.

9. A bellows type shock absorber as in claim 7, wherein said shock absorbing column is a gelled material containing fine hollow particles.

10. A bellows type shock absorber as in claim 7, wherein one of said through holes and said tubular member includes a flow control valve.

11. A bellows type shock absorber as in claim 7, wherein the external surface of said shock absorbing column is an elastic material.

12. A bellows type shock absorber as in claim 7, wherein said gelled material shock absorbing column is silicone.

13. A bellows type shock absorber as in claim 7, wherein said internal chamber of said main bellows body and said sub-bellows have fluid therein.

14. A bellows type shock absorber as in claim 13, wherein said fluid is air.

15. A bellows type shock absorber as in claim 13, wherein said fluid is silicone oil.

16. A bellows type shock absorber comprising:
a compressible and expansible bellows body having first and second open ends;
a first and a second cover member attached to and covering said first and second open ends of said expansible bellows body;
a compressible and expansible gelled material shock absorbing column, said gelled material having a penetration value of from about 50 to about 200 according to JIS K2530 (1976) at a 50 g load, said column having first and second ends attached to said first and second cover members, said gelled material shock absorbing column being surrounded by and spaced apart from said bellows body for defining an internal chamber around said shock absorbing column, said shock absorbing column contracting and expanding along with the compression and expansion of said bellows body without contacting said bellows body for absorbing repeated shocks applied to at least one of said first and second cover member; and
at least two through holes in at least one of said cover members and said bellows body for communicating said internal chamber defined by said gelled material shock absorbing column and said bellows body with the outside environment.

* * * * *